United States Patent [19]

McKay et al.

[11] 3,816,105

[45] June 11, 1974

[54] HYDROMETALLURGICAL PROCESS FOR EXTRACTION OF COPPER AND SULPHUR FROM COPPER IRON SULPHIDES

[75] Inventors: Donald R. McKay; Godefridus M. Swinkels, both of Rossland; Kornel R. V. Szarmes, Trail, all of British Columbia, Canada

[73] Assignee: Cominco Ltd., Vancouver, British Columbia, Canada

[22] Filed: Feb. 22, 1972

[21] Appl. No.: 227,950

[30] Foreign Application Priority Data
Feb. 19, 1971 Canada.................................. 105999

[52] U.S. Cl.................... 75/115, 75/101 R, 75/117, 423/37, 423/567
[51] U.S. Cl....................... C22b 3/00, C22b 15/08
[58] Field of Search................... 75/101 R, 115, 117; 423/37, 567

[56] References Cited
UNITED STATES PATENTS
3,053,651   9/1962   McGauley........................ 75/101 R FOREIGN PATENTS OR APPLICATIONS
520,252   1/1956   Canada
547,012   10/1957  Canada Primary Examiner—Herbert T. Carter

[57] ABSTRACT

A process for the hydrometallurigical extraction of copper values and sulphur in elemental form from copper-iron sulphides in which the sulphides are subjected to an activation leach with an acidic copper sulphate solution whereby insoluble simple copper sulphides and a solution of ferrous sulphate are obtained. After a liquid-solids separation, for the effective separation of iron from copper values, the ferrous sulphate in the solution is oxidized and hydrolyzed to precipitate the iron, which is removed from the process, and to regenerate acid solution containing sulphuric acid. The copper sulphides are treated with an oxygen-bearing gas and with said regenerated sulphuric acid solution in a multiple-stage oxidizing leach to oxidize the sulphide sulphur to elemental sulphur and to liberate the copper as cupric ion for subsequent recovery in metallic form.

24 Claims, 1 Drawing Figure

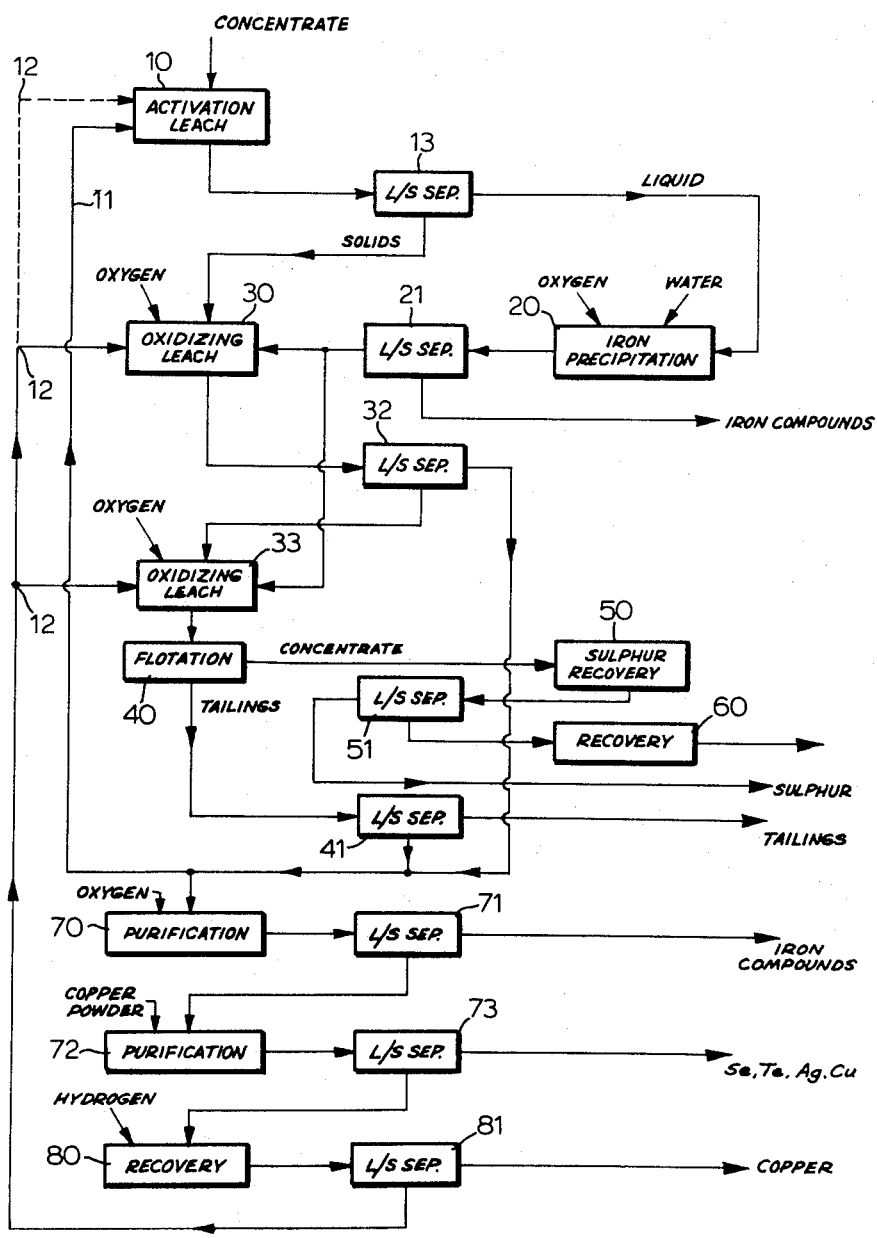

HYDROMETALLURGICAL PROCESS FOR EXTRACTION OF COPPER AND SULPHUR FROM COPPER IRON SULPHIDES

BACKGROUND OF THE INVENTION

This invention relates to a process for treating copper-iron sulphides and, more particularly, is directed to a process for the hydrometallurgical extraction of copper values and sulphur in elemental form from copper-iron sulphides.

Many processes have been developed for the hydrometallurgical extraction of copper values from complex sulphide ores and concentrates. For example, Canadian Pat. No. 520,252 teaches a process for the production of copper in powdered metallic form from copper-bearing ores containing sulphides of copper and iron. However, iron values substantially converted to dissolved sulphates by this process are not separately recovered and not only cause a loss of acid values but also pose disposal problems, with attendant pollution of the environment. Moreover, a significant portion of such iron values are not removed and not only lead to production of undesirable acid but remain to impede copper separation and sulphur recovery.

The production from pyrrhotitic-type ores of non-ferrous metal values, elemental sulphur and iron oxide is disclosed in Canadian Pat. No. 547,012. Also, Canadian Pat. No. 808,108 shows a process for the extraction of copper values and the production of elemental sulphur from sulphides by direct oxidizing pressure leaching. In the processes of both the foregoing patents, iron is converted to iron oxide simultaneously with the conversion of copper to copper sulphate and the conversion of sulphide sulphur to elemental sulphur. As a result, the recovery of sulphur from the residue is impeded by the presence of the iron oxide.

SUMMARY OF THE INVENTION

We have found surprisingly that subjecting copper-iron sulphides to an activation leach, under process conditions to be described, results in conversion of copper values to simple insoluble copper sulphides and conversion of iron values to soluble ferrous sulphate whereby the copper values can be substantially separated from the iron values and each metal component separately treated under conditions optimum for the respective component, without interference from the other, for high and efficient recoveries of copper values and the controlled production of sulphur in elemental form to avoid the undesirable production of sulphates and circulating loads of sulphuric acid.

More particularly according to the process of our invention, copper-containing concentrate is subjected to an activation leach with an acidic solution containing cupric ions whereby insoluble simple copper sulphides and a solution of ferrous sulphate are obtained. After a liquid-solids separation, for the effective separation of iron from copper values, the ferrous sulphate in the solution is oxidized and hydrolyzed to precipitate the iron, which is removed from the process, and to regenerate sulphuric acid. The copper sulphides are treated with an oxygen-bearing gas and with said regenerated sulphuric acid solution in a multiple-stage oxidizing leach to oxidize the sulphide sulphur to elemental sulphur and to liberate the copper as cupric ion. The residue of the last stage of the oxidizing leach is subjected to froth flotation to yield a concentrate containing elemental sulphur and sulphides, and a tailings product containing gangue and a copper bearing solution. Elemental sulphur, metal sulphides containing molybdenum and silver, and precious metals, are recovered separately from the concentrate. The gangue is separated from the copper bearing solution and discarded. A portion of this copper bearing solution is fed to the activation leach and the remaining portion, after a purification operation to reduce residual ferric ion to ferrous ion and to remove selenium, tellurium and residual silver, is subjected to a copper recovery process, such as hydrogen reduction or electrolysis, from which elemental copper is recovered. The residual solution is returned to the two stage oxidizing leach.

It is a principal object of the present invention therefore to provide a low temperature, low pressure hydrometallurgical process for the extraction of copper and sulphur values from complex copper-iron sulphide ores.

It is another object of the invention to provide a hydrometallurgical process which is substantially self-sustaining with substantially no discharge of acid or sulphate values from the operation.

Another object of the invention is the provision of a process which renders copper values in complex sulphide ores highly active for rapid and economic extraction and for production of high purity copper metal and elemental sulphur.

BRIEF DESCRIPTION OF THE DRAWING

The process will now be described in detail with reference to the accompanying flowsheet which schematically illustrates the relationship of the steps of the process.

DESCRIPTION OF THE PREFERRED EMBODIMENT

Concentrates processed according to the present invention have been obtained from copper bearing ores which have been beneficiated according to well-known methods whereby the bulk of the undesirable gangue materials has been removed. The minerals present in the copper concentrates normally comprise copper-iron sulphides such as chalcopyrite and bornite, copper sulphides such as covellite, diginite and chalcocite, as well as precious metals such as silver and gold and sulphides of other base metals such as iron, nickel, molybdenum, lead and zinc. Sulphide concentrates containing 7 to 41 percent copper and 14 to 31 percent iron have been successfully treated by our process.

The concentrates are fed to the activation leach 10 in finely divided form having at least 98 percent pass a 325 mesh screen (Tyler series), to ensure satisfactory activation of the sulphide minerals. The concentrates can be added to the activation leach either as dry solids or in the form of a slurry with an aqueous solution or with water, the latter form being preferred because of water being added to the system, which is desirable in later stages of processing.

The concentrates are treated in the activation leach under non-oxidizing conditions with an acidic solution 11 containing copper ions. In this activation leach copper-iron sulphides are activated whereby the soluble iron is dissolved from the sulphides into solution as ferrous sulphate from which it can be recovered as a solid compound and whereby the copper is the sulphides is transformed into insoluble simple copper sulphides which will react completely and rapidly under subsequent oxidizing leaching conditions.

We have found that it is critical for a successful activation process that the formation of copper sulphate be substantially avoided and that the maximum amount of dissolution of the iron in solution, from which it can be readily precipitated, be effected. The main reaction which occurs in the activation leach can, for example, be illustrated for chalcopyrite by the following equation:

$$CuFeS_2 + CuSO_4 \rightarrow 2 CuS + FeSO_4 \quad (1)$$

The most important secondary reaction which takes place involves iron which is present in the feed solution to the activation leach as ferric ions. This reaction takes place in two parts, which are illustrated in equations (2) and (3) as follows:

$$2Fe_2(SO_4)_3 + CuFeS_2 \rightarrow CuSO_4 + 5FeSO_4 + 2S° \quad (2)$$

$$S° + 3Fe_2(SO_4)_3 + 4H_2O \rightarrow 6FeSO_4 + 4H_2SO_4 \quad (3)$$

As can be seen from the equations (2) and (3), ferric ions convert copper sulphides to copper sulphate, ferrous sulphate and elemental sulphur, the latter reacting further to produce additional ferrous sulphate and sulphuric acid. The copper sulphate formed according to the secondary reaction goes into solution and must be recovered at a later stage in the process. Also, the sulphuric acid adds considerably to the acidity of the system which, as will become evident as the description proceeds, is detrimental to the subsequent operation for removal of the iron from the solution. The amount of ferric ion fed to the activation leach therefore should be kept to a minimum in order to avoid both the dissolution of copper as copper sulphate and the production of excess acid. As will be shown below, the process according to the present invention effectively minimizes the amount of ferric ion added to the activation leach.

The acidic solution 11 which contains copper ions and which is fed to the activation leach from a subsequent operation contains from about 20 to 80 grams per litre (g/l) copper as cupric ion, from about 3 to 15 g/l iron as both ferrous and ferric ion, and from about 5 to 35 g/l $H_2SO_4$. In order to avoid the presence of ferric ions in the acidic solution 11, this solution could be subjected, if so desired, to a separate reduction step to reduce the iron from the ferric to the ferrous state. However, as will be described below, the process according to the present invention is operated in such a manner that the ferric ion concentration in the acidic solution supplied to the activation leach can be maintained at a satisfactory low level so that no separate reduction step is required.

If the concentrate contains an appreciable amount of lime, or oxidized minerals, additional acid may be added to the activation leach. This acid preferably is return acid 12 from the subsequent copper recovery operation.

The main variable in the process of the activation leach is the molar ratio between the amount of copper ions added and the soluble iron content of the feed concentrate. This variable, in combination with the variables of temperature and retention time, determines the degree of iron removal from the concentrate and thus the amount of soluble iron which passes into solution, as well as determining the activity of the leached solids. The lower limiting value of the copper to soluble iron molar ratio will be reached when either the activity of the leached solids is too low for a satisfactory copper extraction in the subsequent oxidation or too much iron passes to the oxidizing leach and subsequently interferes with copper recovery. We have found that values of this ratio in the range of from about 0.5 : 1 to about 1.5 : 1 provide satisfactory results, with a range of from 0.8 : 1 to 0.85 : 1 providing optimum results.

An additional amount of copper ions may be added, over and above the recited ratios, sufficient to react with such metals as are present as sulphides in the feed concentrate and which are more soluble than copper sulphides, such as for example zinc sulphide.

The activation leach is conducted in a pressure vessel either batch wise, or in a continuous fashion, the latter being preferred. We have found that the temperature at which the reaction proceeds is above 90° C., while the preferred temperature range is from about 120° to about 160° C. In this range, the reaction proceeds at a satisfactory rate, while above 180° C., this process step may be uneconomical. The pressure in the reaction vessel is equal to the vapour pressure of the system at the reaction temperature.

The acidity of slurry comprised by the contents of the reaction vessel is important because it affects the separation of the solids from the liquid in the reaction mixture in the subsequent liquid-solids separation step and it affects removal of the dissolved iron from the leach solution.

We have found that at a pH of above about 2 the solids in the reaction mixture are difficult to separate because of the formation of additional precipitates. A small amount of zinc might be present in solution in the acidic solution 11 and will precipitate, at a pH of about 1.2, as ZnS. Also, some calcium carbonate and lime may be present in the concentrate which might form gypsum which will precipitate at a pH above 1 in a very fine form. This ZnS and gypsum cause poor liquid-solids separation characteristics of the reaction mixture. However, at a pH of below about 0.5, the separation of iron from the leach solution in the subsequent iron precipitation step is impeded because of the formation of undesirable complex iron compounds. For satisfactory separation of iron, the pH should be maintained at about 2. We have found therefore that a pH in the range of between about 0.5 and 2 is a suitable compromise to meet both requirements for a good separation and for a successful iron removal, a pH in the range of 1.0 to 1.5 being preferred.

The retention time of the reaction mixture in the reaction vessel depends on the type of concentrate which is being treated as well as the rate with which the activation reaction proceeds and the desired degree of completion of the activation leach. We have found that a retention time of between 15 and 180 minutes gives the desired results. The reaction mixture must be agitated sufficiently to keep the solid material suspended.

The reaction mixture which discharges from the reaction vessel of the activation leach comprises a slurry containing solids in an acidic ferrous sulphate solution. The discharged solids in this slurry contain, in addition to sulphides enriched in copper, compounds of silver, molybdenum and lead. The solids may contain an amount of copper of up to 60 to 65 percent depending on the degree of completion of the activation leach and the amount of gangue materials and other metal sulphides. The iron content of the solids likewise depends mainly on the degree of completion of the activation leach. We have found that by operating the activation leach as described, the weight ratio of copper to iron, calculated in elemental form, in the solids in the reaction mixture has increased sevenfold. For one type of concentrate, this ratio increased to about 20 : 1 from a ratio of about 3 : 1 in the solids fed to the reaction vessel. For another type of concentrate, the ratio increased to 6 : 1 from 0.8 : 1.

The acidic ferrous sulphate solution in the above named slurry contains a high concentration of iron as ferrous ions and a low concentration of copper as cupric ions as well as some elements in minor quantities such as zinc, nickel and magnesium. Usually, the solution contains from about 20 to 100 g/l ferrous ions, from about 0 to 20 g/l cupric ions and from a trace to 30 g/l sulphuric acid. Typically, the solution contains from about 30 to 60 g/l ferrous ions, from about 0 to 5 g/l cupric ions and from about 3 to 15 g/l sulphuric acid.

The discharged reaction mixture is subjected to a liquid-solids separation step 13. We have found that the solids in the mixture settle readily and that it therefore is sufficient to feed the mixture to a settling tank, e.g., a thickener, wherein a good separation of the solid and liquid phases is obtained. The thicknener overflow, which will contain substantially all of the dissolved iron, may be further clarified by filtration, if so desired, before being directed to the iron precipitation step 20.

It will be noted that in the thickener of separation step 13, the hot solution may be concentrated by as much as 10 percent because of natural evaporation. The thickening and filtration are carried out by standard methods using acid resistant equipment.

In the iron precipitation step 20, the ferrous sulphate in the solution from the liquid-solid separation step 13 is converted into insoluble iron compound and sulphuric acid by a combination of oxidation and hydrolysis reactions according to the following equations:

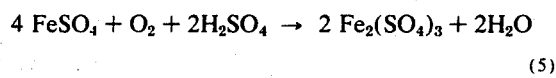

(5)

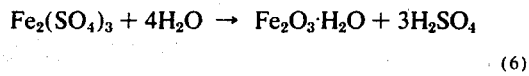

(6)

The end-product must be in an acceptable physical form to per lit easy separation from the reaction mixture using conventional equipment. Moreover, the reactions must be carried out in such a way that loss of any contained copper, e.g., by coprecipitation with the iron product, is kept to a minimum. As is well known in the art, the system $Fe_2O_3 - SO_3 - H_2O$ is complex and, unless well chosen conditions are applied to the conversion process, the end products may contain a mixture of iron compounds of variable composition. Some of these iron compounds are unstable and, if discarded, would cause environmental pollution.

The oxidation and hydrolysis reactions are carried out simultaneously, preferably in a continuous manner, in a reaction vessel. The iron containing solution is fed to the reaction vessel together with a sufficient amount of an oxygen bearing gas to give an oxygen partial pressure in the range of from about 50 to about 200 pounds per square inch (p.s.i.). The contents of the reaction vessel are maintained at a temperature of above about 180° C., preferably in the range of from about 180° to about 230° C. The temperature at which the reactions are conducted is important for the composition as well as the physical form of the iron containing reaction product which is obtained. Temperatures below 180° C., will give reaction products such as basic iron sulphates which are difficult to settle or filter and which result in a loss of useful sulphate.

The initial acid sulphate concentration in the solution must be low, i.e., in the range, as defined above, of from about 20 to 100 g/l iron as ferrous ion and from about 0 to 30 g/l sulphuric acid. Usually the solution contains from about 30 to 60 g/l iron as ferrous ion and from about 3 to 15 g/l sulphuric acid.

To obtain a stable reaction product in the precipitation step it is also necessary to control the amount of iron being fed to the reaction vessel. We have found that by controlling the concentration of iron in the solution fed to the iron precipitation step 20, at not more than 40 g/l, and under the conditions of temperature and pressure as discussed above, iron can be precipitated mainly as stable iron oxide in a one stage precipitation 20. The concentration of iron may be maintained at this level by the addition or removal of water from the solution fed to the reaction vessel of the iron precipitation 20. The amount of water, if added, must be controlled to maintain a proper balance of water in the total process. Water is introduced into the process by way of the feed concentrate slurry, washwater used on filters and by the addition to the iron precipitation operation. Water is removed by natural evaporation and with the various product streams leaving the process. In the event of the presence of excess water, evaporation from a by-pass stream, not shown, following the subsequent liquid-solids separation 21, is a convenient expedient to maintain the water balance.

If the iron concentration in the solution is higher than 40 g/l the precipitated iron compounds contain too much basic sulphate compounds. In this case, the precipitated iron compounds are subjected, after separation from the liquid phase, to a second oxidation and hydrolysis treatment, not shown, at similar temperature and pressure. Prior to this second treatment the solids must be repulped in a solution containing a minimum possible amount of acid sulphate. After a liquid-solids separation, not shown, the liquid fraction is returned to the process, while the solids fraction, mostly iron oxide, is removed.

The oxidation and hydrolysis treatment may be carried out in the presence of ammonium or alkali metal compounds, such as for example, ammonium hydroxide, sodium hydroxide or sodium sulphate, whereby the iron and sulphate are precipitated as jarosite. Jarosites are basic iron sulphates of the alkali-metals or ammonia. The reaction mixture from the iron precipitation reaction vessel is discharged and passed to a liquid-solids separation step 21. The solids fraction from this separation comprises iron compounds which contain mainly iron oxide or jarosite.

The liquid phase from the separation step 21 comprises regenerated acid which contains sulphuric acid in an amount of from about 20 to about 80 g/l $H_2SO_4$, a small amount of iron in the form of both ferrous and ferric ion of from 3 to 20 g/l and all other ions present in the feed to the iron precipitation step. The regenerated acid is fed to an oxidizing leach in order to maintain both the sulphate balance and the solution balance in the overall system.

The solids fraction from the liquid-solids separation step 13 is fed to a multiple-stage oxidizing leach wherein the activated solids are treated with an oxygen bearing gas such as air, oxygen and mixtures thereof in the presence of regenerated acid from the liquid-solids separation 21 and return acid 12 from a subsequent copper recovery step, to dissolve all of the copper present in the activated solids.

The accompanying flowsheet illustrates the oxidizing leach for a leach in two stages, designated by numerals 30 and 33 respectively. The discharge from the first stage oxidizing leach 30 is subjected to a liquid-solids separation 32. The solids from this separation are fed to the second stage oxidizing leach 33, while the liquid is fed to a subsequent purification operation. It will be understood that in a multiple stage operation, the oxidizing leach 30 followed by a liquid-solids separation 32 may be repeated to provide, in combination with the last stage, the desired number of stages. It is advantageous to conduct the oxidizing leach in a continuous manner and the leach stages may be arranged in series, counter-current or cross-current fashion.

The overall reaction which takes place in the oxidizing leach can be represented by the reaction equation:

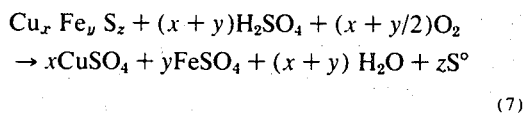

$$Cu_x Fe_y S_z + (x + y)H_2SO_4 + (x + y/2)O_2$$
$$\rightarrow xCuSO_4 + yFeSO_4 + (x + y) H_2O + zS°$$

(7)

wherein $x$, $y$ and $z$ have values in combinations covering the various copper sulphides and copper-iron sulphides. For example for $Cu_2S$, $x$ has the value 2, $y$ has the value 0 and $z$ has the value 1. Under the oxidizing conditions the ferrous sulphate is usually at least partially oxidized to ferric sulphate.

The main reaction taking place in the oxidizing leach is the dissolution of copper as cupric ion and the oxidation of sulphide sulphur to elemental sulphur from e.g. cupric sulphide which is the main product resulting from the activation leach after separation of the iron compounds. The copper sulphide reacts according to reaction equation (7) wherein $x$ has the value 1, $y$ has the value 0 and $z$ has the value 1:

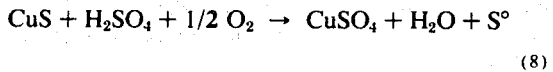

$$CuS + H_2SO_4 + 1/2\ O_2 \rightarrow CuSO_4 + H_2O + S°$$

(8)

Other copper containing sulphides which are present in the solids fraction, such as for example residual chalocopyrite, also tend to be oxidized with formation of cupric sulphate, ferrous and ferric sulphate and elemental sulphur. Sulphides such as those of silver, molybdenum and iron, i.e., pyrite, and precious metals, are not dissolved and remain as solids in the leach residue together with the gangue materials and elemental sulphur.

The oxidizing leach according to the process of the present invention, as follows from the main reaction represented by equation (8), produces cupric sulphate in solution and a precipitate of elemental sulphur, while only a minor amount of ferrous and ferric sulphate is formed. In this, our process is significantly different from other oxidizing leach processes which do not first realize a substantially complete separation of the soluble iron compounds from the copper. Such other processes oxidize and hydrolyse the iron compounds in situ to basic sulphates and hydroxides or hydrated oxides which are difficult to separate from the copper sulphate solution while, moreover, the recovery of sulphur from the mixture of sulphur and precipitated iron compounds is difficult to achieve. Still other processes do not produce sulphur in elemental form but oxidize the sulphur to sulphate. This sulphate is recovered in the form of sulphuric acid and is recirculated, creating an excess acid in the circuit which must necessarily be removed.

The solids fraction from the liquid-solids separation 13 which is fed to the oxidizing leach 30 usually comprises a slurry containing at least 50 percent solids with up to 65 percent by weight copper content. The amount of liquid in the slurry should be kept at a minimum because this liquid will increase the liquid circulating load as well as increase the size of the equipment required throughout the entire process. The regenerated acid solution from the iron precipitation 20 which is fed to each stage of the oxidizing leach contains from about 20 to 80 g/l $H_2SO_4$ and about 3 to 20 g/l ferrous and ferric ions. The return acid 12, which is returned from the subsequent copper recovery step and which is fed to each stage of the oxidizing leach, contains from about 40 to 120 g/l $H_2SO_4$, from about 0 to 40 g/l cupric ions and from about 0 to 10 g/l ferrous ion. The composition of the return acid will depend largely on the method of copper recovery used. If, for example, hydrogen reduction is employed, the return acid may contain from about 100 to 110 g/l $H_2SO_4$, from about 10 to 25 g/l copper as cupric ions and from about 1 to 5 g/l iron as ferrous ions. If so desired, the regenerated acid and the return acid may be fed to the oxidizing leach from a common vessel.

The operating parameters under which the oxidizing leach is performed are highly critical. The most critical operating parameter is the temperature. We have found that at temperatures above 100° C. the oxidation reaction proceeds initially at a high rate but this rate decreases sharply with time. We believe that this reduction in the reaction rate is due to the activity of the solids and the exothermic nature of the reaction which causes localized overheating with consequent melting of sulphur. The molten sulphur blinds the surface of the particles thereby preventing continuing oxidation.

We have found that the temperature to achieve a good rate of extraction at a satisfactory efficiency is in the range of from about 70° to about 110° C. The limiting temperature is that temperature at which the iron in solution starts to hydrolyze and precipitate with an associated loss of silver and molybdenum.

We have also found that by maintaining the temperature in the first, or earlier stages, of the oxidizing leach in the lower end of the range, i.e., within the range of from about 70° to 100° C., the blinding of particle surfaces is effectively prevented, while the temperature in the later, or last, stages of the leach may be maintained in the higher end of the range, i.e., within the range of about 90° to 110° C.

The oxidizing leach can be performed under a wide range of pressures. We have found that in the presence of an oxygen bearing gas the pressure in the oxidizing leach may be up to about 400 p.s.i. to provide satisfactory extractions. Pressures above 400 p.s.i., although effective, require high pressure equipment, necessitating additional capital costs. Thus, it is possible to conduct the oxidizing leach with an oxygen bearing gas under pressures in the range of from about atmospheric to about 400 p.s.i.

An effective oxidizing leach can be obtained by maintaining the pressure in the first, or earlier, stages of the oxidizing leach in the lower end of the above stated pressure range, while maintaining the pressure in the later, or last stages in the higher end of the disclosed range.

For example, we have found that a substantial portion of the copper sulphides will be oxidized in the presence of an oxygen bearing gas in the first stage oxidizing leach wherein the pressure is substantially atmospheric pressure. It is preferred to maintain the pressure in the first, or earlier stages of the oxidizing leach, in the range of from substantially atmospheric to about 300 p.s.i., and to maintain the pressure in the last, or later stages, in the range of from about 200 to about 400 p.s.i.

The retention time of the reaction mixture in each of the stages of the oxidizing leach may vary within a broad range and is dependent not only on the required extraction in each stage but also on the conditions in each stage. Thus we have found that at lower temperatures and pressures the retention time may be between 2 and 48 hours, while at higher temperatures and pressures the retention time may vary between 30 minutes and 12 hours.

The acidity of the reaction mixture in the oxidizing leach is critical and must be carefully controlled to ensure a high dissolution of the copper as well as to prevent the precipitation of iron compounds and associated loss of silver and molybdenum.

If the pH of the reaction mixture rises too high, the iron in the solution will hydrolyse and precipitate, and the valuable silver and molybdenum which are present in the reaction mixture will be occluded by this precipitate and will leave the process in the tailings from the subsequent flotation step. The acidity is controlled so as to prevent iron precipitation by the addition of regenerated acid and/or return acid. We have found that a residual free acid content of about 1 g/l for every 1 g/l iron is desirable. When operating the oxidizing leach at 100° C. and a pH of one, the loss of silver and molybdenum is effectively prevented.

The discharge from the oxidizing leach 33 is passed directly to a froth flotation operation 40, wherein the elemental sulphur, metal sulphides and precious metals are separated from the gangue materials and solution. This flotation also results in a very effective liquid-solids separation, i.e. only a small amount of dissolved copper in the solution is removed in the froth containing the sulphur, metal sulphides and precious metals. By using a collector such as organic dithiophosphate for sulphur, a flotation concentrate is obtained which contains the elemental sulphur, as well as substantially all of the silver and molybdenum as sulphides, other precious metals, iron compounds and unleached copper sulphides, as well as some gangue materials. The flotation concentrate contains a high amount of sulphur which makes it possible to effectively recover the elemental sulphur. We have found that the concentrate may contain up to 85 percent S° by weight.

If so desired, the flotation concentrate may be subjected to a liquid-solids separation and the solids washed to recover additional dissolved copper values.

The elemental sulphur is separated from the sulphides in a sulphur recovery step 50 followed by a liquid-solids separation 51. This recovery can be accomplished using one of a number of methods. For example, because of the high concentration of sulphur a convenient and efficient method is to heat the concentrate above the melting point of sulphur, separate the molten sulphur in liquid-solids separation 51 by a convenient method such as filtration, and recover the sulphur. The residue of the concentrate may, after separation of the sulphur, be treated in a recovery step 60 to recover the copper, molybdenum, silver and other precious metals.

The flotation tailings, which contain the copper solution and the insoluble non-sulphide gangue materials, such as silicates and magnetite from the feed concentrate, are subjected to a liquid-solids separation 41 to separate the copper bearing solution from the solids tailings. Conventional settling and vacuum filtration followed by washing are satisfactory to remove any copper from the tailings, which are discarded after neutralization of the acid content. The resulting copper bearing solution is combined with the liquid portion from the liquid-solids separation step 32. This combined solution contains about 20 to 80 g/l copper as cupric ions, about 5 to 25 g/l sulphuric acid and about 3 to 15 g/l iron as ferric iron. The combined solution is split in two portions, a minor portion 11 being returned to the activation leach 10 while the remaining major portion is treated in a purification operation.

In the purification, the ferric ions present in the solution must be reduced to the ferrous state and a portion of the iron may be removed, if so desired. Residual silver, as well as selenium and tellurium, are simultaneously precipitated in the reduction purification.

In those cases wherein the iron content of solution to be purified is high, it is advantageous to conduct the purification step in two stages as illustrated in the flowsheet.

In the first purification stage 70, the iron in solution is precipitated in a manner as described above in connection with the iron precipitation step 20. The iron in solution is oxidized and hydrolysed continuously at a temperature of at least 160° C., preferably in the range of from about 180° to 220° C., under a partial pressure of oxygen in the range of from about 50 to 200 p.s.i. The retention time is 30 minutes or less. After a liquid-solids separation 71 to remove the precipitated iron compounds, copper powder is added to the liquid fraction in the second stage purification 72 to reduce any remaining ferric ion to the ferrous state and to precipitate the silver, selenium and tellurium in the solution on the added copper powder. Following the second stage purification, the solution is separated from the copper powder with the precipitated elements in liquid-solids separation step 73, usually by filtration. The residue containing silver, selenium, tellurium and copper, may be further treated to recover valuable constituents.

Alternatively, if the iron content in the solution to be purified is sufficiently low, the first purification stage 70 and the subsequent liquid-solids separation 71 may be omitted. A single purification with copper powder, as in the second stage purification 72, is then sufficient to obtain a solution free of ferric ions which is satisfactory for the recovery of copper therefrom.

The purified solution from liquid-solids separation 73 is fed to a recovery step 80, wherein elemental copper is precipitated from the solution. For recovery of copper from the purified solution any one of a number of well known methods may be employed, such as electrowinning, chemical precipitation with subsequent reduction, or direct reduction with a reducing gas. We have found that a direct reduction with hydrogen gas at elevated temperature and pressure in a continuous fashion is very rapid and offers significant economic advantages over other methods. The reaction is carried out on a continuous basis in a suitable reaction vessel at a temperature of about 180° C., under a pressure of about 450 p.s.i. and with agitation. The retention time required for the reduction of the cupric sulphate solution is not more than 5 minutes.

The purified solution from the liquid-solids separation 73 fed to the reaction vessel of the recovery step 80 may contain from about 25 to 80 g/l copper as cupric ions, from 5 to 25 g/l sulphuric acid and from a trace to 10 g/l iron as ferrous ions. When employing direct reduction of the solution with hydrogen to recover elemental copper, this solution usually contains from about 50 to 80 g/l cupric ions, from about 10 to 20 g/l sulphuric acid and only from about 2 to 4 g/l iron. Copper powder of a high grade is recovered from the reaction vessel discharge.

The residual liquid from the copper reduction step 80 is recirculated as return acid 12 to the two stages of the oxidizing leach 30 and 33. This return acid contains from about 100 to 110 g/l sulphuric acid, from about 10 to 25 g/l copper as cupric ions and from about 0 to 10 g/l iron as ferrous ions.

As is obvious from the high copper concentration of the return acid, the copper fed to the recovery step is only partially removed. Because it is possible in the process according to the present invention to recycle the residual solution from the recovery to the oxidizing leach, it is not necessary to recover the maximum amount of copper from the solution. The recovery step can therefore be designed for optimum conditions to yield the most economical results.

In order to prevent the build-up of concentrations of minor elements, such as magnesium or zinc, and sulphate ions in the process, it is necessary to provide one or more bleed-streams at any convenient place, or places. The amount of bleed depends on the amounts of magnesium and zinc in the concentrate; generally a circulating load of $Mg^{++}$ and $Zn^{++}$ in the process of about 20 to 30 g/l is acceptable. Any copper which is present in the bleed-streams is recovered, for example, by chemical precipitation or cementation on iron. The residual solution may be further treated to recover other values, or may be discarded after neutralization of the acid content to prevent pollution.

The process according to the present invention offers a number of important advantages over known processes. The present process provides for a distinct separation of copper from soluble iron in the concentrate in the first process step, i.e., the activation step, permitting subsequent treatment of the copper and the iron in separate circuits. The residual solids obtained from the activation step contain substantially all the copper and can be oxidized completely. The treatment of copper and iron together is substantially eliminated, hence the requirements for equipment and material loadings in the copper circuit are substantially reduced. The small amount of residual iron which enters the copper circuit does not interfere with the recovery of copper and is easily eliminated, if desired. The complete oxidation of the solids makes it possible to convert the sulphur into its elemental form in such a high concentration that an effective recovery by pelletization or filtration can be used. The conversion of substantially all the sulphur in the process into the elemental form not only yields a valuable by-product but avoids circulating large volumes of sulphuric acid and also avoids the necessity of removal of the excess acid from the process. Treating the soluble iron in a separate circuit makes it possible to recover an iron-containing product which does not include occluded copper, silver and other valuable materials. The iron is recovered in such a way that the iron containing product can not be a source of pollution, while acid is regenerated for use in the process.

The process of our invention will now be illustrated in the following examples, with reference to the flow-sheet for the sequence of process steps.

EXAMPLE 1

1,000 grams of a finely divided ground high chalcopyrite containing concentrate, analyzing 25.5 percent copper, 30.9 percent iron and 30.8 percent sulphur, were treated in an activation leach at 140° C. for a period of 168 minutes with a return acid from a subsequent hydrogen reduction step containing 108 g/l sulphuric acid, 3.2 g/l iron as ferrous sulphate and 18.4 g/l copper as cupric sulphate, and a copper sulphate solution containing 63.5 g/l copper, 7.5 g/l iron and 25 g/l sulphuric acid.

The pH in the activation was about 1. The molar ratio of copper in solution added to the concentrate to the soluble iron in the concentrate was 0.8 : 1.

After the specified period, the solids residue was separated from the solution by filtration. The solution, analyzing 2 g/l copper, 60 g/l iron and 24.5 g/l sulphuric acid was oxidized and hydrolyzed to precipitate the iron in an autoclave at 200° C., at 100 p.s.i. partial pressure oxygen, for 20 minutes to precipitate the iron. After liquid-solids separation of the reaction products, the solids, which had a molar ratio of iron to sulphur of 1.6 : 1, were subjected to a second treatment under similar conditions to reduce the acid content of these solids.

The regenerated acid, containing 11.7 g/l iron and 29.1 g/l sulphuric acid, was mixed with return acid and the solids residue from the activation leach, which contained 49.5 percent copper, 8.7 percent iron and 23.5 percent sulphur, and the mixture subjected to a two stage oxidizing leach.

In the first stage oxidizing leach the mixture was treated in an autoclave for 45 minutes at a temperature of 90° C., at 200 p.s.i. partial pressure of oxygen and at a pH of about 1. After filtration, the solids residue, analyzing 10.2 percent copper, 11.5 percent iron, 46.9 percent total sulphur, was subjected to the second stage oxidizing leach. The extraction of copper in the first stage leach was 92%.

In the second stage leach, the first stage residue was repulped with return acid and regenerated acid and oxidized in an autoclave for 4 hours at 90° C., at 200 p.s.i. partial pressure oxygen and a pH of less than 1. In this second stage, 93.6 percent copper was extracted. The overall copper extraction in the oxidizing leaches was better than 99 percent.

The residue from the second stage oxidizing leach was subjected to a flotation using Aerofloat as a collector. The flotation concentrate contained 1.7 percent copper, 5.8 percent iron, 79.7 percent total sulphur and 77.7 percent elemental sulphur, as well as most of the silver and molybdenum contained in the original concentrate. Substantially all the sulphur was recovered from the flotation concentrate by a combination of pelletization, hot filtration and solvent extraction.

The tailings from the flotation were separated from solution and contained less than 0.1 percent copper, 0.9 percent iron and 3.9 percent total sulphur.

The copper bearing solution from the tailings was combined with the copper bearing solution from the filtration of the reaction mixture from the first stage oxidizing leach. A portion of this solution, containing 63.5 g/l copper, 7.5 g/l iron and 25 g/l sulphuric acid, was returned to the activation leach, while the remainder was subjected to purification.

In the purification, the solution was treated for 30 minutes at a temperature of above 160° C., and at 100 p.s.i. partial pressure oxygen, whereby 4.5 g/l iron was precipitated as iron oxide. The remaining solution was treated with metallic copper and the resulting solution, containing 70 g/l copper, 3 g/l iron and 28 g/l sulphuric acid, was subjected to a reduction with hydrogen gas.

In the hydrogen reduction, the solution was treated at 180° C., at 450 p.s.i. for 5 minutes. After the reduction, the precipitated copper was recovered, and the remaining solution fed to the oxidizing leach and the activation.

EXAMPLE 2

A concentrate containing major proportions of chalcopyrite and bornite, analyzing 40.9 percent copper, 14.2 percent iron and 22.5 percent sulphur was ground with water until 98 percent passed a 325 mesh screen (Tyler Screen Series). 1,000 grams of the ground concentrate were treated in an activation leach at 150° C., for 90 minutes with a return acid, containing 20.9 g/l copper as copper sulphate, 5.3 g/l iron as ferrous sulphate and 117 g/l sulphuric acid, and a copper sulphate solution from the subsequent first stage oxidizing leach containing 70.0 g/l copper as copper sulphate, 4.2 g/l iron as both ferrous and ferric sulphate and 34.0 g/l sulphuric acid.

The pH in the activation was about 1. The molar ratio of copper in solution added to the concentrate, to the soluble iron in the concentrate, was 0.8 : 1. The solids from the activation leach, containing 52.8 percent copper, 3.3 percent iron and 20.3 percent sulphur, were separated by filtration from the solution, which analyzed 0.1 g/l copper, 39.3 g/l iron and 14.1 g/l sulphuric acid.

This solution was treated in an autoclave at 200° C., at 100 p.s.i. partial pressure oxygen for 20 minutes whereby an iron oxide product precipitated which had an iron to sulphur molar ratio of 4.5 : 1. The remaining acid content in this product was neutralized by the addition of lime. The acid regenerated in this autoclave was separated from the iron product by filtration and analyzed 5.8 g/l iron as ferrous sulphate and 57.5 g/l sulphuric acid.

The solids from the activation leach with regenerated acid and return acid were oxidized in the first stage oxidizing leach for 45 minutes at a temperature of 90° C., and at 200 p.s.i. partial pressure oxygen; the pH was about 1.2. The extraction of copper was 78.6 percent.

After filtration of the first stage autoclave product, the solids fraction was submitted, after repulping with return acid, to a second stage oxidizing leach for 5.5 hours at 90° C., at 200 p.s.i. partial pressure oxygen. The pH in the second stage autoclave was less than one, and 94.8 percent of the copper in the first stage leach residue was extracted. The overall copper extraction for both leaches was 98.6 percent.

The residue from the second stage oxidizing leach was subjected to froth flotation using "Aerofloat" as collector. The flotation concentrate contained 2.1 percent copper, 0.6 percent iron, 77.5 percent total sulphur and 76.2 percent elemental sulphur, as well as most of the silver and molybdenum contained in the original concentrate. Substantially all the elemental sulphur was recovered from the concentrate by a combination of pelletization, hot filtration and solvent extraction.

The tailings from the flotation were separated from copper bearing solution and contained 0.04 percent copper, 0.9 percent iron and 0.1 percent sulphur.

A portion of the solution from the filtration of the reaction mixture from the first stage oxidizing leach was returned to the activation leach while the remaining portion was combined with the solution separated from the flotation tailings. The combined copper bearing solution, containing 58.9 g/l copper and 5.3 g/l iron, was purified with metallic copper powder to reduce any ferric ion to the ferrous state and the treated solution was subjected to a hydrogen reduction to precipitate copper from the solution. After separation of the precipitated copper, the residual solution was recycled as return acid to the activation leach and to both stages of the oxidizing leach.

EXAMPLE 3

In this example, the same ground ore of Example 2 was subjected to an activation with a return acid, analyzing 20.9 g/l copper, 3 g/l iron and 117 g/l sulphuric acid and with a copper bearing solution, analyzing 72.5 g/l copper, 5.4 g/l iron and 23.2 g/l sulphuric acid, at 150° C., for only 45 minutes. After filtration of the final reaction mixture, the solution analyzed 2.4 g/l copper, 37.3 g/l iron and 14.2 g/l sulphuric acid, while the solids residue analyzed 53.6 percent copper, 5.1 percent iron and 21.7 percent sulphur.

The solution was treated in an autoclave under the same conditions as in Example 2. The solids produced had a molar ratio of iron to sulphur of 3.2 : 1, while the regenerated acid contained 7.9 g/l iron and about 55 g/l sulphuric acid.

Treating the solids residue from the activation with the regenerated acid and return acid in a first stage oxidizing leach, as in Example 2, gave a copper extraction of 81.7 percent.

The solids residue from the first stage oxidizing leach was treated for 4 hours in a second stage oxidizing leach under the same temperature and pressure as in the first stage. The copper extraction was 90.7 percent. The overall copper extraction was 97.8 percent.

The shorter retention time in the activation leach resulted in a lower dissolution of iron from the concentrate (64 percent versus 76 percent in Example 2), and a loss of copper with the iron containing solution (2.4 g/l vs. 0.1 g/l in Example 2).

EXAMPLE 4

A ground concentrate containing major proportions of chalcopyrite and bornite was treated in an activation leach at 159° C., for 60 minutes with a return acid and a copper sulphate solution. The solids from the activation leach, containing 54.8 percent copper, 1.9 percent iron and 21.5 percent sulphur, were separated from this solution.

The separated solids were oxidized in a first stage oxidizing leach in the presence of return acid and regenerated acid by bubbling oxygen through the reaction mixture under substantially atmospheric pressure for a period of 12 hours at a temperature of 80° C. The extraction of copper was 50 percent.

The first stage oxidizing leach product was filtered and the solids fraction, which contained 30.3 percent copper, 2.4 percent iron and 33.1 percent sulphur was submitted, after repulping with return acid and regenerated acid, to a second stage oxidizing leach for 5 hours at 105° C., at 200 p.s.i. partial pressure oxygen.

The overall copper extraction from the concentrate treated in the activation leach and in both the oxidizing leaches was 97 percent.

It will be understood, of course, that the foregoing examples are exemplary only in illustrating typical embodiments of the process of our invention and that modification can be made in the process of our invention as described hereinabove without departing from the scope and purview of the appended claims.

What we claim as new and desire to protect by Letters Patent of the Unites States is:

1. A process for treating copper-iron sulphides to extract copper values and elemental sulphur therefrom which comprises the steps of:
   1. feeding said sulphides into and reacting said sulphides with an acidic copper sulphate solution at a temperature in the range of from about 90° to about 180° C., said solution having a minimum of ferric ion and containing from about 5 to about 35 grams per litre of sulphuric acid and containing cupric ions in a molar ratio relative to the soluble iron in the range of from about 0.5 : 1 to 1.5 : 1, for the production of an insoluble simple copper sulphide and a solution of ferrous sulphate;
   2. separating the solution of ferrous sulphate from the insoluble simple copper sulphide;
   3. concurrently oxidizing and hydrolyzing the ferrous sulphate for the precipitation of iron compounds and the regeneration of sulphuric acid;
   4. separating the precipitated iron compounds from the regenerated sulphuric acid for recycle of said acid within the process;
   5. subjecting the insoluble copper sulphide to an oxidizing leach in sulphuric acid for oxidation of sulphide sulphur to elemental sulphur and for dissolution of copper as cupric ion to form a copper-bearing solution;
   6. discharging a mixture of copper-bearing solution, elemental sulphur and residual solids from the oxidizing leach; and
   7. recovering copper values from said copper-bearing solution.

2. In a process as claimed in claim 1, subjecting the insoluble simple copper sulphide to an oxidizing leach in the said regenerated sulphuric acid.

3. In a process as claimed in claim 2, reacting said sulphides with said acidic copper sulphate solution at a pH in the range of from about 0.5 to about 2.0.

4. In a process as claimed in claim 2, reacting said sulphides with said acidic copper sulphate solution at a pH in the range of from about 1.0 to about 1.5.

5. In a process as claimed in claim 3, reacting said sulphides with said acidic copper sulphate solution in a reaction vessel at the vapour pressure of the system at the reaction temperature.

6. In a process as claimed in claim 3, reacting said sulphides with said acidic copper sulphate solution at a temperature within the range of from about 120° to about 160° C.

7. In a process as claimed in claim 3, maintaining the molar ratio of cupric ions to soluble iron in the copper-iron sulphides in the range of from about 0.8 : 1 to 0.85 : 1.

8. In a process as claimed in claim 3, oxidizing and hydrolysing the ferrous sulphate at a temperature in the range of from about 180° to about 230° C. and at a pressure in the range of from about 50 to about 200 p.s.i.

9. In a process as claimed in claim 8, controlling ferrous iron concentration in the solution fed to the oxidizing and hydrolysing step at not more than 40 grams per litre.

10. In a process as claimed in claim 8, oxidizing and hydrolysing the ferrous sulphate in the presence of ammonium or alkali metal compounds whereby the ferrous sulphate is precipitated as jarosite.

11. In a process as claimed in claim 10, said ammonium or alkali metal compounds being selected from the group consisting of ammonium hydroxide, sodium hydroxide and sodium sulphate.

12. In a process as claimed in claim 2, subjecting the insoluble copper sulphide to a multiple stage oxidizing leach at a pressure of up to about 400 p.s.i.

13. In a process as claimed in claim 12, subjecting the insoluble copper sulphide to a multiple stage oxidizing leach at a temperature in the range of from about 70° to about 110° C.

14. In a process as claimed in claim 2, subjecting the insoluble copper sulphide to a multiple stage oxidizing leach and maintaining the first stage oxidizing leach at a pressure in the range of from atmospheric to about 300 p.s.i. and the last stage oxidizing leach at a pressure in the range of from about 200 to about 400 p.s.i.

15. In a process as claimed in claim 14, maintaining the first stage oxidizing leach at a temperature in the range of from about 70° to about 100° C., and maintaining the last stage oxidizing leach at a temperature in the range of from about 90° to 110° C.

16. In a process as claimed in claim 2, floating elemental sulphur and sulphides from the mixture discharged from the oxidizing leach to produce a concentrate containing elemental sulphur, metal sulphides and precious metals.

17. In a process as claimed in claim 16, separating the elemental sulphur from the metal sulphides and precious metals.

18. In a process as claimed in claim 2, reducing ferric iron in the copper-bearing solution to ferrous iron and subjecting the resultant solution to hydrogen reduction for production of metallic copper and acid solution.

19. In a process as claimed in claim 18, recycling acid solution produced in the hydrogen reduction to the oxidizing leach.

20. In a process as claimed in claim 18, recycling a portion of the acid solution produced in the hydrogen reduction to form at least a part of the said acid copper sulphate solution.

21. In a process as claimed in claim 2, recovering copper values from the copper-bearing solution by electrowinning for the production of metallic copper and acid solution.

22. In a process as claimed in claim 21, recycling acid solution produced by electrowinning to the oxidizing leach.

23. In a process as claimed in claim 2, recycling a portion of the copper-bearing solution from the oxidizing leach to form at least part of the said acidic copper sulphate solution.

24. In a process as claimed in claim 2, said sulphides having a particle size such that at least 98% of said sulphides pass a 325 mesh screen.

* * * * *